United States Patent
Zhang et al.

(10) Patent No.: US 6,858,661 B2
(45) Date of Patent: Feb. 22, 2005

(54) DEFOAMER FOR WATER REDUCER ADMIXTURE

(75) Inventors: Xuan Zhang, Woburn, MA (US); Josephine Ho-Wah Cheung, Waltham, MA (US); Ara Avedis Jeknavorian, Chelmsford, MA (US)

(73) Assignee: W. R. Grace & Co.-Conn., Columbia, MD (US)

( * ) Notice: Subject to any disclaimer, the term of this patent is extended or adjusted under 35 U.S.C. 154(b) by 2 days.

(21) Appl. No.: 10/475,062

(22) PCT Filed: Apr. 26, 2002

(86) PCT No.: PCT/US02/13226

§ 371 (c)(1),
(2), (4) Date: Oct. 15, 2003

(87) PCT Pub. No.: WO02/088241

PCT Pub. Date: Nov. 7, 2002

(65) Prior Publication Data

US 2004/0149175 A1 Aug. 5, 2004

Related U.S. Application Data

(60) Provisional application No. 60/287,985, filed on May 1, 2001.

(51) Int. Cl.[7] ................................................ C08K 3/00
(52) U.S. Cl. ......................... 524/5; 106/823; 106/808; 106/727
(58) Field of Search .............................. 524/5; 106/823, 106/808, 727

(56) References Cited

U.S. PATENT DOCUMENTS

| 4,471,100 | A |   | 9/1984  | Tsubakimoto et al. | ...... 525/367 |
| 4,589,995 | A |   | 5/1986  | Fukumoto et al. | .......... 252/180 |
| 4,870,120 | A | * | 9/1989  | Tsubakimoto et al. | ......... 524/5 |
| 5,369,198 | A |   | 11/1994 | Albrecht et al. | ............. 526/240 |
| 5,393,343 | A |   | 2/1995  | Darwin et al. | ............... 106/808 |
| 5,661,206 | A |   | 8/1997  | Tanaka et al. | ............... 524/378 |
| 6,139,623 | A |   | 10/2000 | Darwin et al. | .............. 106/823 |
| 6,187,841 | B1|   | 2/2001  | Tanaka et al. | .................. 524/5 |
| 6,214,958 | B1|   | 4/2001  | Fukumoto et al. | ....... 526/318.3 |

FOREIGN PATENT DOCUMENTS

| JP | 285140/88 | 11/1988 | ........... C04B/24/04 |
| JP | 163108/90 | 6/1990  | ......... C08F/216/20 |

OTHER PUBLICATIONS

International Search Report, Applicaion No. PCT/US02/13226, Sep. 5, 2003.

* cited by examiner

Primary Examiner—William K. Cheung
(74) Attorney, Agent, or Firm—Craig K. Leon; William L. Baker

(57) ABSTRACT

An exemplary admixture system for cementitious compositions, comprises a polycarboxylic acid type water reducer and a tertiary amine defoamer having an average molecular weight of 100–1500 and more preferably 200–750. The defoamer permits a stable admixture formulation and helps to achieve a controllable level of entrained air in a concrete mix. Cementitious compositions and methods for modifying the same, using the tertiary amine defoamers, are also described herein.

24 Claims, No Drawings ic acid type water reducing admixture that imparts high slump and maintains the slump for an extended period of time without excessive set retardation and which has the ability to provide improved air control in cement compositions would be highly desired.

DEFOAMER FOR WATER REDUCER ADMIXTURE

This is a section 371 application based on International Application No.: PCT/US02/13226, filed Apr. 26, 2002, which claims priority to U.S. Ser. No. 60/287,985 filed May 1, 2001.

FIELD OF THE INVENTION

The present invention relates to water reducing admixtures for hydratable cementitious compositions and to the resultant improved hydratable cementitious compositions, and more particularly to polycarboxylic acid type water reducing admixtures in combination with tertiary amine defoamers, as fully described hereinbelow.

BACKGROUND OF THE INVENTION

Hydratable (or hydraulic) cements, such as Portland cement, are useful in forming structural formations, such as building members, precast members and the like. These hydratable cements are mixed with aggregate to form mortars (cement, small aggregate, such as sand, and water) or concrete (cement, small aggregate, large aggregate, such as stone, and water) and structures made therefrom. It is highly desired to increase the flow (slump) properties of the initially formed hydratable cement composition to aid in placement of the composition and to extend the period of high flowability in order to provide working time to finish the placement of the structure. While extending the period of time that high slump is imparted to a cement composition, it is not desired to have the initial set time significantly delayed as such delay would disrupt the desired work schedule and delay completion of the structural formation.

Increased flowability can be attained by using large dosages of water in the hydrating cement composition. However, it is well known that the resultant cement based structure will have poor compressive strength and related properties which will make it unsuitable as a structural formation. Various additives have been proposed to increase the flowability to hydraulic cement compositions without increasing the water content of the initially formed composition. Such additives have been classified as "water reducing" admixtures or "superplasticizers," and these include, for example, compounds such as naphthalene or melamine sulfonate formaldehyde condensates, lignin sulfonates and the like. In certain instances, the "water reducers" or "superplasticizers" have been used as a means of reducing the water to cement ratio in the composition (to enhance the strength of the resultant structure) without comprising flow properties.

More recently, copolymers of alkenyl ethers and acrylic acid or maleic anhydride, and derivatives thereof, have been proposed as agents suitable to enhance slump. See. e.g., Japanese Patent Publication (Kokai) Nos. 285140/88 and 163108/90. Further, copolymers formed from the copolymerization of hydroxy-terminated allyether and maleic anhydride or the allyether and a salt, ester or amide derivative of maleic anhydride such as disclosed in U.S. Pat. No. 4,471,100 have been proposed as cement admixtures capable of enhancing slump. Still further, U.S. Pat. No. 5,369,198 teaches the use of maleic acid derivatized polymers as a suitable water reducer.

In each of the above instances, the proposed cement admixture agents when used in a cement composition do not provide the desired combination of properties or only provide them in low degrees. For example, esterified acrylate copolymers, while providing good slump enhancement, also causes the treated cement composition to exhibit excessive set retardation In addition, it has been observed that polycarboxylates, such as described in U.S. Pat. No. 5,369,198, provide good slump but may introduce excessive amounts of air to the resultant structural formation Although a certain degree of intentionally entrained air in the form of microbubbles is desired to enhance freeze-thaw characteristics of the resultant structure, excessive air entrainment is not desired as it can cause reduction in the strength of the structure formed.

Various agents have been proposed to either enhance (air entrainers) or reduce (air detrainers) the air content produced by counteracting the effects other additives have on a particular cement composition. For example, in U.S. Pat. Nos. 5,665,158 and 5,725,657, Darwin et al. disclosed the use of oxyalkylene amine based defoaming agents for formulation with a copolymer of polycarboxylic acid and polyoxyalkylenes of the comb type variety. The general composition claimed was $X_2N(BO)_zR$, wherein X represented hydrogen, $(BO)_zR$, or mixtures thereof, R represented hydrogen, a $C_1$–$C_{10}$ alkyl group, or $BNH_2$, B represented a $C_2$–$C_{10}$ alkylene group, and z represented an integer from 5 to 200. An alkoxypolyoxyalkylene ammonium polymer was ionically attached to the carboxylate portion of the comb polymer backbone, so as to impart desired air controlling properties to the hydratable cementitious composition being treated.

In U.S. Pat. No. 6,139,623, Darwin et al. disclosed a combination having a superplasticizer comprising a polyacrylate comb polymer emulsified with an antifoaming agent selected from the group consisting of a composition having the formula $(PO)(O-R)_3$ wherein R is a $C_2$–$C_{20}$ alkyl group, a phosphate ester, an alkyl ester, a borate ester, a silicone derivative, and EO/PO type defoamer; and a surfactant that was operative to stabilize the emulsified comb polymer and antifoaming agent. The surfactant was selected from the group consisting of (1) an esterified fatty acid ester of a carbohydrate selected from the group consisting of a sugar, sorbitan, a monosaccharide, a disaccharide, and a polysaccharide; and (2) a $C_2$–$C_{20}$ alcohol having EO/PO groups.

Short of being attached directly to the superplasticizer polymer, conventional air detraining agents are not readily made compatible with the polycarboxylic acid type superplasticizers, or are not otherwise stable when added together in an aqueous solution. Separation of the polycarboxylate superplasticizers and defoamers can lead to inconsistent air contents in cementitious mixtures which hinders achievement of the desired result. While attempts have been made to achieve single compositions having the ability to enhance flowability without excessive air entrainment, many of these attempts have not generally produced the desired stability for extended periods.

Thus, it is highly desired to have a single, storage stable cement admixture that imparts a high degree of slump or maintains this degree of slump over an extended period of time when administered to a structural hydratable cement composition, while avoiding excessive set retardation and providing suitable air entrainment properties to the resultant hydraulic cement structure. It is desired to have a cement admixture capable of providing slump, set and air entrainment properties which are consistent over an extended period throughout manufacture, storage, shipping and job site storage, without having the problems of dissociation, separation and the like.

Thus, in view of the foregoing, the inventors believe that a novel water reducing admixtures (or "superplasticizer")

and defoaming agent system are needed for modifying hydratable cementitious compositions.

SUMMARY OF THE INVENTION

In surmounting the problems of the prior art, the present invention provides a water reducing admixtures with a tertiary amine defoamer having formulation stability and controllable air entrainment capabilities.

One objective of this invention is to overcome the occasional tendency of typical polycarboxylic acid polymer water reducing admixtures to entrain significant amounts of air in concrete, a tendency that sometimes decreases concrete strength and durability. Another objective is to overcome the problems of defoamers added during formulation and which, due to their hydrophobicity, can sometimes lead to formulations that are unstable in that they can experience phase separation within a few days.

An examplary admixture system of the invention comprises: (A) a water reducing admixtures, preferably one comprising a polycarboxylic acid or salt or derivative thereof, and (B) a tertiary amine defoamer represented by the structural formula $R^1NR^2R^3$ wherein $R^1$ is hydrophobic and represents a $C_8-C_{25}$ group comprising a linear or branched alkyl, alkene, alkyne, alcohol, ester or oxyalkylene group (e.g., polyoxyalkylene) represented by the formula $R^4$-$(AO)_n$— or $R^4$—$(OA)_n$- wherein $R^4$ represents hydrogen or a $C_1$ to $C_{25}$ alkyl group, A represents a $C_1$ to $C_6$ alkyl group and "n" is an integer of 1 to 4; and $R^2$ and $R^3$ each represent a $C_1-C_6$ group comprising a branched or linear alkyl, alkene, alkyne, alcohol, ester or oxyalkylene group (e.g., polyoxyalkylene) represented by the formulae $R^4$-$(AO)_n$— or $R^4$—$(OA)_n$- wherein $R^4$ represents hydrogen or a $C_1-C_{25}$ alkyl group, A represents a $C_1$ to $C_6$ alkyl group, and "n" is an integer of 1 to 4; and wherein the average molecular weight of the tertiary amine defoamer is 100–1500 and more preferably 200–750. The water reducing admixture, preferably a comb polymer having pendant groups, may optionally contain air defoaming agents ionically bonded to the comb polymer.

The invention also pertains to hydratable cementitious compositions having the admixture system with the water reducing admixtures and tertiary amine defoamers described above, and methods for treating such compositions using the water reducing admixtures and tertiary amine defoamers combination.

DETAILED DESCRIPTION OF EXEMPLARY EMBODIMENTS

The term "cement composition" as may be used herein refers to pastes, mortars, grouts such as oil well cementing grouts, and concrete compositions comprising a hydraulic cement binder. The terms "paste", "mortar" and "concrete" are terms of art, pastes are mixtures composed of a hydraulic cement binder (usually, but not exclusively, Portland cement, masonry cement, or mortar cement and may also include limestone, hydrated lime, fly ash, blast furnace slag, and silica fume or other materials commonly included in such cements) and water; mortars are pastes additionally including fine aggregate, and concretes are mortars additionally including coarse aggregate. The cement compositions tested in this invention are formed by mixing required amounts of certain materials, e.g., a hydraulic cement, water, and fine or coarse aggregate, as may be applicable to make the particular cement composition being formed.

The term "admixture," as used herein and in the appended claims, is a term of art referring to compounds and compositions added to cement mixtures or compositions to alter their properties. The term does not imply that the components of an admixture do or do not interact to cause the desired result. Admixtures are generally categorized as "water-reducing agents" if they are capable of modifying fluidity to a limited degree or as "high range water-reducing agents" (so-called "superplasticizers") if they have the ability to permit large water cuts in the cement mixture while maintaining fluidity or cause large increases in fluidity at constant water content. The terms "water reducer" and "superplasticizer" may be used interchangeably throughout this specification and the claims, although those skilled in the concrete arts generally understand that a superplasticizer is a high range water reducer.

The term "polycarboxylic acid (or salt or derivative thereof)" as used herein refers to the type of water reducer/ superplasticizer useful for dispersing cement particles within an aqueous cementitious slurry. Preferably, such water reducers also contain polyether groups, more particularly polyoxyalkylene groups. More preferably, such water reducers have a comb polymer structure wherein the polyether groups include repeating polyoxyalkylene groups located in the carbon-containing backbone and/or in the pendant groups ("teeth") of the comb structure. Most preferred are comb polymers wherein the polyoxyalkylene groups, such as ethylene oxide and/or propylene oxide, are located in the pendant groups attached to the polymer backbone. Exemplary water reducers or superplasticizers of the invention should preferably have an average molecular weight in the range of 10,000–100,000 and more preferably 20,000–60,000.

Exemplary admixture systems of the invention are aqueous solutions comprising, in addition to dilution water, the following: (A) a water reducer, preferably one comprising a polycarboxylic acid or salt or derivative thereof, and more preferably comprising a comb polymer having a backbone to which are attached pendant cement anchoring groups and oxyalkylene members (See e.g., U.S. Pat. No. 5,393,343 of Darwin; U.S. Pat. No. 5,643,978 of Darwin et al.; U.S. Pat. No. 5,725,657 of Darwin et al.; and U.S. Pat. No. 5,665,158 of Darwin et al., incorporated by reference herein); and (B) a tertiary amine defoamer represented by the structural formula $R^1NR^2R^3$ wherein $R^1$ is hydrophobic and represents a $C_8-C_{25}$ group comprising a linear or branched alkyl, alkene, alkyne, alcohol, ester or oxyalkylene group (e.g., polyoxyalkylene) represented by the formula $R^4$-$(AO)_n$— or $R^4$—$(OA)_n$- wherein $R^4$ represents hydrogen or a $C_1-C_{25}$ alkyl group, A represents a $C_1$ to $C_6$ alkyl group and "n" is an integer of 1 to 4; and $R^2$ and $R^3$ each represent a $C_1-C_6$ group comprising a branched or linear alkyl, alkene, alkyne, alcohol, ester or oxyalkylene group (e.g., polyoxyalkylene) represented by the formulae $R^4$-$(AO)_n$— or $R^4$—$(OA)_n$- wherein $R^4$ represents hydrogen or a $C_1-C_{25}$ alkyl group, A represents a $C_1$ to $C_6$ alkyl group, and "n" is an integer of 1 to 4; and wherein the average molecular weight of the tertiary amine defoamer is 100–1500 and more preferably 200–750. The water reducing admixture, preferably a comb polymer having pendant groups, may optionally contain air defoaming agents ionically bonded to the comb polymer.

Further exemplary admixture systems of the invention, in addition to the water reducer and tertiary amine defoamer summarized above, further comprise an amine defoamer, such as taught in U.S. Pat. Nos. 5,665,158 and 5,725,657 of Darwin et al. wherein oxyalkylene amine based defoaming agents were ionically attached to the backbone of polycarboxylic acid polymers. The general composition for the amine defoamer is represented by the formula, $X_2N(BO)_zR$, wherein X represented hydrogen, $(BO)_zR$, or mixtures thereof, R represented hydrogen, a $C_1$–$C_{10}$ alkyl group, or $BNH_2$, B represented a $C_2$–$C_{10}$ alkylene group, and z represented an integer from 5 to 200. Therefore, further exemplary admixture systems comprise a water reducer and two different amine defoamers. An alkoxypolyoxyalkylene ammonium carboxylate was ionically attached to the comb polymer. In exemplary admixture systems which have this water reducer comb polymer and ionically attached carboxylate, the water reducer and tertiary amine should be combined in a ratio of about 10:1 to 1:10.

Exemplary water reducers can include those mentioned in the Background section above. Thus, water reducers suitable for use in the invention include comb type polymers (having pendant ethylene oxide/propylene oxide, or "EO/PO," groups) and comprise acrylic polymers or copolymers thereof, which may be imidized, such as those taught in U.S. Pat. No. 5,393,343 assigned to W. R. Grace & Co.-Conn. (incorporated herein by reference). The polymer which may be imidized is an "acrylic polymer" (or which may alternatively referred to as a "polyacrylic polymer") which refers to, for example, a homopolymer or copolymer of acrylic acid, methacrylic acid, their alkali metal salts, as well as their $C_1$–$C_{30}$ alkyl esters. Additionally, the acrylic polymer reactant and the resultant imidized acrylic polymer may contain units derived from other singly and doubly ethylenically unsaturated monomers, such as styrene, alpha-methystyrene, sulfonated styrene, maleic acid, acrylonitrile, butadiene and the like. Such other ethylenically unsaturated monomer derived units, when present, can be present in the polymer in amount of up to about 20 (preferably, up to about 10) weight percent of the total polymer, provided that the resultant imidized acrylic polymer is water soluble.

An exemplary imidized acrylic polymer may be formed such as by reacting an acrylic polymer with ammonia or an alkoxylated amine. The amine reactant useful in forming the desired acrylic polymer can be selected from ammonia or an alkyl-terminated alkoxy amine represented by the formula:

$$H_2N\text{-}(AO)_n\text{---}R''$$

in which AO represents a $C_2$–$C_{10}$ (preferably a $C_2$–$C_4$) oxyalkylene group in which O represents an oxygen atom and A represents a $C_2$–$C_{10}$ (preferably a $C_2$–$C_4$) alkylene group; and R'' represents a $C_1$–$C_{10}$ (preferably $C_1$–$C_4$) alkyl group and n is an integer selected from 1 to 200 and preferably from 1 to 70. The reaction conditions and catalysts are generally known. See e.g., U.S. Pat. No. 5,393,343 at Columns 3–4.

An exemplary acrylic comb polymer, preferably one that is imidized, that is suitable for use as comb polymer in the present invention comprises a carbon containing backbone to which is attached groups shown by the following structures (I) and (II), and, optionally in further embodiments, additionally by structures (III) and/or (IV):

(I)

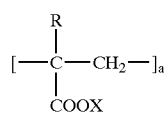

(II)

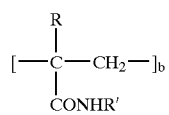

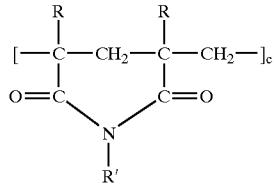

(III)

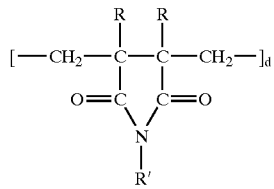

(IV)

wherein each R independently represents a hydrogen atom or a methyl group (—$CH_3$) group; X represents hydrogen atom, a $C_1$–$C_{10}$ alkyl group, R' or an alkali or alkaline earth metal cation, an alkanolamine, or a mixture thereof; R' represents a hydrogen atom or a $C_2$–$C_{10}$ oxyalkylene group represented by $(AO)_nR''$ in which O represents an oxygen atom, A represents a $C_2$–$C_{10}$ alkylene group, R'' represents a $C_1$–$C_{10}$ alkyl and n represents an integer of from 1–200, or mixtures thereof; and a, b, c, and d are numerical values representing molar percentage of the polymer's structure such that a is a value of about 50–70; the sum of c plus d is at least 2 to a value of (100–a) and is preferably from 3 to 10; and b is not more than (100–(a+c+d)). (This polymer may be made in accordance with U.S. Pat. No. 6,139,623 of Darwin et al.). The present inventors prefer that the value of a is 50–100, the sum of c plus d is zero to a value of (100–a), and b is no more than (100–(a+c+d)).

Another exemplary comb polymers suitable for use in the present invention comprise a copolymer of a polyoxyalkylene derivative as represented by the following formula (1) and maleic anhydride, a hydrolyzed product of the copolymer, or a salt of the hydrolyzed product:

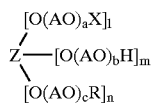

wherein "Z" represents a residue of a compound having from 2 to 8 hydroxy groups; "AO" represents an oxyalkylene group having from 2 to 18 carbon atoms; "X" represents an unsaturated hydrocarbon group having from 2 to 5 carbon atoms; "R" represents a hydrocarbon group having from 1 to 40 carbon atoms; "a" represents 1 to 1,000; "l" represents 1 to 7, "m" represents 0 to 2; and "n" represents 1 to 7; "l"+"m"+"n"=2 to 8, "m"/("l"+"n") is less than or equal to ½, and "al"+"bm"+"cn" is equal to or greater than 1. The copolymer shown above is taught in U.S. Pat. No. 4,946,904, issued to Akimoto et al. (and assigned to NOF), which patent is incorporated by reference as if fully set forth herein.

Further exemplary comb polymer suitable for use in the present invention is disclosed in U.S. Pat. No. 5,369,198, owned by Chemie Linz Gessellshaft m.b.H., incorporated herein by reference. Such comb polymers are composed of the following structural elements:

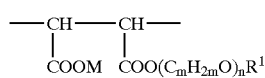 (A)

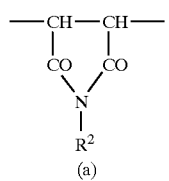 and/or 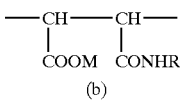 and/or
(a) (b)

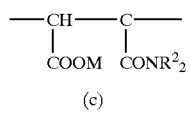 and, optionally, (C)

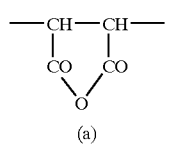 and/or 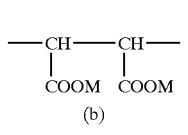 (D)
(a) (b)

whereby M represents H or a cation such as alkaline or a alkaline-earth metal, an ammonium group, or the residue of an organic amino group; $R^1$ represents $C_1$ to $C_{20}$ alkyl, $C_5$ to $C_8$ cycloalkyl or aryl group residue; $R^2$ represents H, $C_1$ to $C_{20}$ alkyl or hydroxyalkyl, $C_5$ to $C_8$ cycloalkyl or aryl group residue in which 1 or more H atoms can be substituted by the structural elements —COOM, —$SO_3M$ and/or $PO_3M_2$, as well as structural units of the General Formula $(C_mH_{2m}O)_nR^1$, which optionally can be repeated; $R^3$ represents H, a methyl or methylene group which can be substituted if necessary and which forms a 5 to 8-member ring or an indene ring which includes $R^5$; $R^4$ represents H, a methyl or ethyl group; $R^5$ represents H, $C_1$–$C_{20}$ alkyl, $C_5$–$C_8$ cycloalkyl or aryl group residue, an alkoxy carbonyl group, an alkoxy group, an alkyl or aryl carboxylate group, a carboxylate group, a hydroxyalkoxy carbonyl group; m represents a whole number from 2 to 4; and n represents a whole number from 0–100, preferably from 1–20. Methods for making the aforementioned copolymer are provided in U.S. Pat. No. 5,369,198, incorporated herein by reference.

Another exemplary comb polymer suitable for use in the present invention comprises water-soluble linear copolymers of N-vinylamides with monomeric addition products of amines, amino acids, amino groups containing aromatic sulfonic acids, amino alcohols of maleic anhydride as well as maleic esters of polyoxyalkyleneglycols or their monoethers. One structural unit is represented by Formula (A) or by Formula (B); the other partial structure unit being represented by Formula (C):

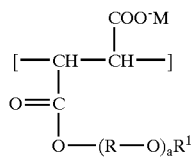 (A)

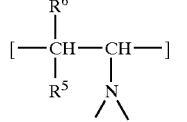 (B)

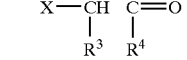

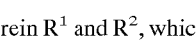 (C)

wherein $R^1$ and $R^2$, which may be the same or different, each represent hydrogen, a $C_1$–$C_{20}$ alkyl residue which may optionally include alkali metal carboxylate or alkaline earth metal carboxylate groups, an aromatic group, an aliphatic or cycloaliphatic residue which may optionally include sulfonic acid groups or alkali metal sulfonate or alkaline earth metal sulfonate groups, a hydroxyalkyl group, preferably a hydroxy ethyl- or hydroxypropyl group, or may together with the nitrogen atom to which they are bound, form a morpholine ring; M represents a hydrogen ion, a monovalent or divalent metal ion or a substituted ammonium group; R represents a hydrogen atom or an alkyl group having 1 to 4 carbon atoms; p, q, and r are integers; a represents an integer ranging from 1 to 100; $R^3$ and $R^4$ which may be the same or different, each represent hydrogen, a $C_1$ to $C_{12}$-alkyl residue, a phenyl residue, or may together form a di-, tri-, or tetramethylene group, which form with the inclusion of the residue of the formula:

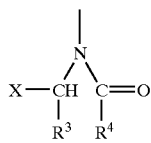

a five, six, or seven membered ring; $R^5$ and $R^6$ which may be the same or different, each represent hydrogen, a $C_1$ to $C_{12}$-alkyl residue or phenyl residue; and X represents hydrogen, a $C_1$ to $C_4$-alkyl residue, a carboxylic acid group, or an alkali metal carboxylate group. Such copolymer is known and taught in U.S. Pat. No. 5,100,984 issued to Burge et al., and assigned to Sika AG, which patent is incorporated fully by reference as if set forth herein.

Further known water reducers of the polycarboxylate variety are believed to be suitable for use in the present invention, for example those disclosed in U.S. Pat. No. 4,471,100 of Tsubakimoto et al.; U.S. Pat. No. 4,589,995 of Fukumoto et al.; U.S. Pat. No. 4,870,120 of Tsubakimoto et al.; European Patent No. 0753488A2 (U.S. Pat. No. 6,187,841) of Tanaka et al.; U.S. Pat. No. 5,661,206 of Tanaka et al.; and U.S. Pat. No. 6,214,958 B1 of Bi Le-Khac et al., which are all incorporated fully herein by reference.

An exemplary water reducer was disclosed in U.S. Pat. No. 4,471,100 (owned by Nippon Shokubai KK), wherein Tsubakimoto et al. disclosed a copolymer represented by the general formula I:

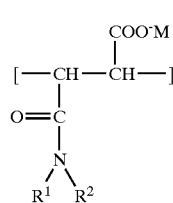

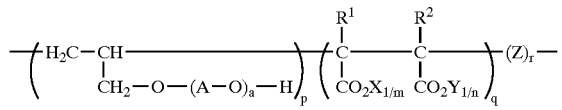

wherein, A denotes an alkylene group of 2 to 4 carbon atoms, a denotes an integer of the value of 1 to 100, the subunit —$CH_2$—O-(-A-O—)$_a$H comprises a plurality of oxyalkylene segments having a randomly provided number of carbon atoms in the alkylene moiety, $R^1$ and $R^2$ independently denote hydrogen atoms or a methyl group, X and Y independently denote a monovalent metal atom, a divalent alkaline earth metal atom, ammonium group, an organic amine group or (—B—O)—$_b R^3$ (wherein, B denotes an alkylene group of 2 to 4 carbon atoms, b denotes 0 or an integer of the value of 1 to 100, and $R^3$ denotes a hydrogen atom or an alkyl group of 1 to 20 carbon atoms), the sub unit —(B—O—)$_b$ comprises a plurality of oxyalkylene segments having a randomly provided number of carbon atoms in the alkylene moiety, Z denotes a structural unit derived from a copolymerizable vinyl monomer, m and n each denote 1 where X and Y are each a monovalent metal atom, an ammonium group, an organic amine group or (—B—O—)$_b R^3$, or 2 where X and Y are each a divalent metal atom, and p, q and r denote numbers such that 25<=p<=75, 25<=q<=75, and 0<=r<=50 are satisfied on condition that p+q+r equals 100, and it is provided that the structural units involved herein may be bonded in any possible order.

The copolymer represented by the general formula I described above is manufactured by copolymerizing: (p) moles, i.e. 25 to 75 moles of a polyalkylene glycol monoallyl ether represented by the general formula II:

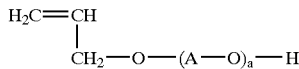

wherein, A, a and $CH_2$—O-A-O—$_a$ are as defined above, (q) moles i.e. 25 to 75 moles of a maleic acid type monomer represented by the general formula III:

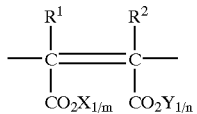

wherein, $R^1$, $R^2$, X, Y, m and n are as defined above, and (r) moles i.e. 0 to 50 moles of a vinyl monomer copolymerizable with the monomers mentioned above (providing that the total of the moles of the moles of p, q and r is 100 moles), in the presence of a polymerization initiator.

An exemplary water reducer was disclosed in U.S. Pat. No. 4,589,995 (owned by Kao Corp.), wherein Fukumoto et al. disclosed a maleic acid copolymer which comprises repeating structural units of the formula (I):

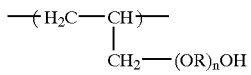

wherein OR represents an oxyalkylene group of 2 or 3 carbon atoms and n represents an integer of from 1 to 50, and repeating structural units of the formula (II):

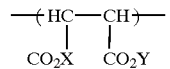

wherein X and Y each represent hydrogen, an alkali metal, an alkaline earth metal, an ammonium group or an organic amino group, wherein the molar ratio of the total number of units of formula (I) to that of units of formula (II) ranges from 5/100 to 50/100, and the number average molecular weight is from 400 to 20,000.

Still another exemplary water reducer was disclosed in U.S. Pat. No. 4,870,120 (owned by Nippon Shokubai), wherein Tsubakimoto et al. disclosed a water reducer (otherwise referred to as a "cement dispersant") having as a main component thereof at least one polymer selected from the group consisting of water soluble polymers obtained from (A) 1 to 99 mol % of a sulfonic acid type monomer represented by the formula I:

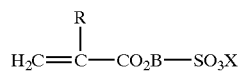

wherein R stands for hydrogen atom or methyl group, X stands for hydrogen atom, a monovalent metallic atom, a divalent metallic atom, ammonium group, or an organic amine group, A and B independently stand for an alkylene group of 2 to 4 carbon atoms, m stands for 0 or an integer of the value of 1 to 100, and the alkylene oxide group of 2 to 4 carbon atoms in the portion, $(AO)_m$, may be bound in any desired sequence, and (B) 99 to 1 mol % of other monomer copolymerizable with the sulfonic acid type monomer, and polymers obtained by neutralizing the aforementioned polymers with an alkaline substance.

Another exemplary water reducing admixture was disclosed in European Patent 073488A2 and U.S. Pat. No. 6,187,841 B1 (owned by MBT Holding Ag, wherein Tanka et al. disclosed cement dispersant comprising as a main component a polycarboxylic acid type polymer (A) or salt thereof, wherein the polymer (A) has a weight average molecular weight in the range of 10,000 to 500,000 in terms of polyethylene glycol determined by gel permeation chromatography, and has a value determined by subtracting the peak top molecular weight from the weight average molecular weight in the range of 0 to 8,000; the polycarboxylic acid type polymer (A) is obtained by copolymerizing: 5 to 98% by weight of an (alkoxy)polyalkylene glycol mono(meth)acrylic ester monomer (a) represented by the following general formula (1):

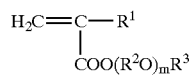

wherein $R^1$ is a hydrogen atom or a methyl group, $R^2O$ is one species or a mixture of two or more species of an oxyalkylene group having 2 to 4 carbon atoms, wherein when $R^2O$ is a mixture of two or more species of oxyalkylene group having 2 to 4 carbon atoms, $(R^2O)_m$ is a block or random copolymer, $R^3$ is a hydrogen atom or an alkyl group of 1 to 5 carbon atoms, and m is the average addition mol number of oxyalkylene groups which is an integer in the range of 1 to 100; 95 to 2% by weight of a (meth)acrylic acid monomer (b) represented by the following general formula (2):

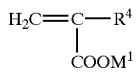

wherein $R^4$ is a hydrogen atom or a methyl group and $M^1$ a hydrogen atom, a monovalent metal atom, a divalent metal atom, an ammonium group, or an organic amine group; 0 to 50% by weight of a monomer (c) which is different than (a) and (b) wherein said monomer (c) is selected from the group consisting of esters of aliphatic alcohols of 1 to 20 carbon atoms with (meth)acrylic acid, unsaturated dicarboxylic acids, unsaturated amides, aromatic vinyls and unsaturated sulfonic acids, and which is copolymerizable with (a) and (b); wherein the total amount of (a), (b) and (c) is 100% by weight.

Another exemplary water reducing admixture was disclosed in U.S. Pat. No. 5,661,206 owned by MBT Holding AG and Nippon Shokubai Co., wherein Tanaka et al. disclosed a "fluidity-controlling admixture" for cementitious compositions comprising an aqueous solution of a polymer, the polymer formed by polymerizing a monomer mixture in the presence of at least one oxyalkylene-based defoaming agent, said monomer mixture comprising (a) 5–98% by weight of an (alkoxy)polyalkylene glycol mono(meth) acrylic acid ester monomer of formula (I)

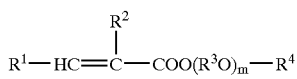

wherein $R^1$ and $R^2$ are independently hydrogen or methyl, $R^3$ is an alkylene group of from 2–4 carbon atoms, $R^4$ is hydrogen or an alkyl group of from 1 to 22 carbon atoms, and m represents an integer of 1 to 100, (b) 2 to 95% by weight of a (meth)acrylic acid based monomer of formula (II)

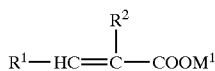

wherein $R^1$ and $R^2$ have the meanings given above, and $M^1$ is hydrogen, a monovalent metal, a divalent metal, an ammonium group or an organic amine group, and (c) 0 to 50% by weight of a monomer capable of being copolymerized with monomers (a) and (b), provided that the sum of (a), (b) and (c) shall be 100% by weight, said oxyalkylene-based defoaming agent selected from the group consisting of (poly)oxyalkylenes, (poly)oxyalkylene alkyl ethers, oxyethylene and oxypropylene adducts of high alcohols of 12 to 14 carbon atoms, polyoxyalkylene(alkyl)aryl ethers, acetylene ethers of alkylene oxide additionally polymerized with acetylene alcohols, (poly)oxyalkylene aliphatic acid esters, (poly)oxyalkylene (alkyl)aryl ether sulfuric acid esters, (poly)oxyalkylene alkyl phosphates, (poly)oxyalkylene sorbitan aliphatic acid esters and (poly)oxyalkylene alkylamines, said defoaming agent being either dissolved in the polymer solution or stably dispersed therein in particles of no more than 20 μM diameter.

Also disclosed in U.S. Pat. No. 5,661,206 was a polymer formed by polymerizing a monomer mixture in the presence of at least one oxyalkylene-based defoaming agent, said monomer mixture comprising (a) 5–98% by weight of an (alkoxy)polyalkylene glycol mono(meth)allyl ether based monomer of formula (III)

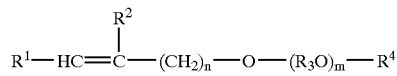

wherein $R^1$ and $R^2$ are independently hydrogen or methyl, $R^3$ is an alkylene group of from 2–4 carbon atoms, $R^4$ is hydrogen or an alkyl group of from 1 to 22 carbon atoms, m represents an integer of 1 to 100, and n is 0 or 1; (b) 2 to 95% by weight of an ethylenically Unsaturated carboxylic acid based monomer of formula (IV)

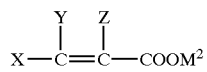

wherein X and Y are independently selected from hydrogen, methyl and —COOM$^3$ or X and Y together with —COOM$^2$ form an anhydride ring, Z is selected from —CH$_2$, COOM$^3$, hydrogen or methyl, and M$^2$ and M$^3$ are independently selected from hydrogen, monovalent metal, divalent metal, an ammonium group, an organic amine group, an alkyl group of 1–20 carbon atoms, an alkylene glycol of 2–4 carbon atoms and a polyalkylene glycol of from 2–100 moles of glycol adduct, provided that a least one of M$^2$ and M$^3$ is selected from hydrogen, monovalent metal, divalent metal, ammonium group and an organic amine group, and (c) 0 to 50% by weight of a monomer capable of being copolymerized with monomers (a) and (b), provided that the sum of (a), (b) and (c) shall be 100% by weight, said oxyalkylene-based defoaming agent selected from the group consisting of (poly)oxyalkylenes, (poly)oxyalkylene alkyl ethers, oxyethylene and oxypropylene adducts of high alcohols of 12 to 14 carbon atoms, polyoxyalkylene(alkyl)aryl ethers, acetylene ethers of alkylene oxide additionally polymerized with acetylene alcohols, (poly)oxyalkylene aliphatic acid esters, (poly)oxyalkylene (alkyl)aryl ether sulfuric acid esters, (poly)oxyalkylene alkyl phosphates, (poly)oxyalkylene sorbitan aliphatic acid esters and (poly)oxyalkylene alkylamines, said defoaming agent being either dissolved in the polymer solution or stably dispersed therein in particles of no more than 20 μM diameter.

As mentioned above, an exemplary tertiary amine defoamer of the invention is represented by the formula $R^1NR^2R^3$ wherein $R^1$ is hydrophobic and represents a $C_8$–$C_{25}$ group comprising a linear or branched alkyl, alkene, alkyne, alcohol, ester or oxyalkylene group, the oxyalkylene group having the chemical structure $R^4$-(AO)$_n$— or $R^4$—(OA)$_n$- wherein $R^4$ represents hydrogen or a $C_1$–$C_{25}$ alkyl group, A represents a $C_1$ to $C_6$ alkyl group and "n" is an integer of 1 to 4; and $R^2$ and $R^3$ each represent a $C_1$–$C_6$ group comprising a linear or branched alkyl, alkene, alkyne, alcohol, ester or oxyalkylene group, the oxyalkylene group having the chemical structure $R^4$-(AO)$_n$— or $R^4$—(OA)$_n$- wherein $R^4$ represents hydrogen or a $C_1$–$C_{25}$ alkyl group, A represents a $C_1$ to $C_6$ alkyl group, and "n" is an integer of 1 to 4; wherein said average molecular weight of said tertiary amine defoamer is 100 to 1500 and more preferably 200–750.

In further exemplary defoamers of the invention, the groups represented by $R^1$, $R^2$, or $R^3$ may comprise alkyl, alkene, alkyne, alcohol, ester, or oxyalkylene (e.g., polyoxyalkylene) groups which are linear or branched. In further exemplary defoamers, $R^1$ represents a polyoxyalkylene group wherein said A comprises a $C_3$–$C_4$ branched alkyl group, and "n" is an integer of 2–4. In still further exemplary defoamers, $R^1$ is preferably a long chain (linear or branched) alkyl group, preferably having 14–20 carbons, and $R^2$ and/or $R^3$, and preferably both are alkyl and/or alcohol groups, and more preferably branched alkyl groups and/or alcohol groups (e.g., such as propanol or tertiary butyl). More particularly, exemplary tertiary amine defoamers of the invention may comprise tallowalkyliminobispropanol, dodecyldimethylamine, octadecyldimethylamine, oleyldimethylamine, cocoalkyliminobispropanol, oleyliminobispropanol, tallowalkyldimethylamine, oleyldimethylamine, cocoalkyldimethylamine, soyaalkyldimethylamine, dicocoalkylmethylamine, tridodecylamine, or mixtures thereof.

In particularly preferred defoamers, none of $R^1$, $R^2$, or $R^3$ represent hydrogen.

In exemplary admixtures of the invention the water reducer and tertiary amine defoamer are present together in a ratio no less than 9:1 and in a ratio no more than 200:1, and more preferably 11:1 to 100:1, and most preferably 15:1 to 50:1.

The present invention is also directed to hydratable cementitious compositions, comprising: a hydratable cementitious binder such as Portland cement (optionally with fine aggregate and/or coarse aggregate); and the aforementioned combination of water reducer and tertiary amine defoamer, which is preferably combined with the cement binder after during addition of hydration water, and preferably as one premixed component. The present invention is also directed to methods for modifying a hydratable cementitious composition, comprising introducing the water reducer and tertiary amine defoamer to a hydratable cementitious binder, with optional fine and/or coarse aggregates.

The present invention can be further appreciated in view of the following examples, which are provided for illustrative purposes only.

EXAMPLE 1

A sample of polyethylene-polypropylene oxide polymer with a molecular weight of 2000 (80 g) was charged into a round bottom flask purged with argon. The sample was heated and stirred. At 80 degress C., a sample polyacrylic acid with a molecular weight of 5000 in 50% aqueous solution (40 g) was added. The mixture was heated to 180 degrees C. Water contained in the polyacrylic acid and formed during the condensation reaction were collected in a DEAN-STARK condenser. The mixture was reacted at 180 degrees C. for one hour.

EXAMPLE 2

The polymer product of Example 1 above was introduced into water to form a 35% wt percent aqueous solution. Tertiary amines as described below were introduced into separate samples of the solution in various dosages (as weight percent based on polymer in solution). The tertiary amines were:

(a) Tallowalkyliminobispropanol;
(b) Dodecyldimethylamine;
(c) Octadecyldimethylamine; and
(d) Oleyldimethylamine.

Each of the solutions were stirred for 0.5 hours at ambient temperature and the pH of final solution was 4–4.5. The resultant solutions were stored at ambient conditions for 60 days without showing any phase separation. The ammonium salt polymers formed according to Example 2 above were each tested as part of an ordinary Portland cement mortar for slump and air as outline below. The sand/cement/water ratio of 2.5/1/0.38 was used. The mortar was mixed in a Hobart mixer for 9 min. The dosage of the polymer was 0.13% based on solid polymer to solid cement (solids on solids "s/s") in the mortar. Results were presented in Table 1 below.

TABLE 1

| Example | Amine (wt. % of polymer) | Slump (mm) | Air (vol %) at 9 min | Air (vol %) at 30 min |
|---|---|---|---|---|
| 2a | 1.43 | | 2.6 | 7.1 |
| 2a | 2.86 | | 1.7 | 2.7 |
| 2a | 5.71 | | 2.1 | 1.9 |
| 2b | 5.71 | 112 | 5.2 | |
| 2c | 5.71 | 116 | 4.8 | |
| 2d | 1.43 | 114 | 5.3 | 6.7 |
| 2d | 2.51 | 112 | 4.2 | 5.8 |
| 2d | 2.86 | 113 | 4.4 | 4.5 |
| 2d | 5.71 | 111 | 3.6 | 4.3 |
| 1 | 0 | 116 | 18.6 | |

EXAMPLE 3

The polymer product of Example 1 above was introduced into water to form a 35% wt percent aqueous solution. Primary and quaternary amines as described below were introduced into separate samples of the solution in various dosages (as weight percent based on polymer in solution). The primary and quaternary amines were:

a) Dodecylamine
b) Octadecylamine
c) Polyoxypropylene terminated with primary amine group (MW=2000)
d) Decyltrimethyl ammonium chloride
e) Tallowalkyltrimethyl chloride Each of the solutions were stirred for 0.5 hours at ambient temperature and the pH of final solution was 4–4.5. The resultant solutions were stored at ambient conditions for 60 days without showing any phase separation. Table 2 shows the mortar slump and air results, tested in the same procedure as described in Example 2.

TABLE 2

| Primary amine | Amine (wt. % of polymer) | Slump (mm) | Air (vol %) at 9 min | Air (vol %) at 30 min |
|---|---|---|---|---|
| 3a | 5.71 | 127 | 20.5 | |
| 3b | 6.71 | 122 | 19.2 | |
| 3c | 1.43 | | 4.6 | 6.4 |
| 3c | 2.51 | | 4.5 | 4.7 |
| 3c | 5.71 | | 4.0 | 3.9 |
| 3d | 11.4 | 104 | 11.8 | |
| 3e | 11.4 | 108 | 15.6 | |
| 1 | 0 | 116 | 18.6 | |

EXAMPLE 4

To provide a water reducer and primary amine/tertiary amine system of the invention, wherein these amines are both ionically attached to the water reducer, one may first make a 35% wt aqueous solution of the polymer product of Example 1 and combine a primary amine, such as polyoxypropylene terminated with primary amine group (MW= 2000), with a tertiary amine, such as tallowalkyliminobispropanol. The ratio of primary amine to tertiary amine should preferably be about 1:10 to 10:1, and the total amount of amines should be about 0.5–6% wt based on the water reducer. The solutions should be stirred for 0.5 hours at ambient temperature, and the pH of final solution is expected to be around 4–4.5. It is expected that the resultant solutions may be stored at ambient conditions for 60 days without showing any phase separation.

EXAMPLE 5

An exemplary water reducer/tertiary amine of the present invention may also be made by combining in flask a tertiary amine, such as tallowalkyliminobispropanol, with a water reducing polymer made in accordance with U.S. Pat. No. 4,471,100. This patent describes the making of the. polymer as follows: A reactor made of glass and provided with a thermometer, a stirrer, a dropping funnel and a gas tube was charged with 334 parts of polyethylene glycol monoallyl ether (containing an average of five ethylene oxide units per molecule) and 100 parts of water. The mixture in the reactor was stirred and the air in the reactor was displaced with nitrogen. The stirred mixture was heated to 95° C. under a blanket of nitrogen gas. Then, an aqueous solution obtained by dissolving 139.3 parts of maleic acid and 14.2 parts of ammonium persulfate in 225 parts of water was added to the reactor over a period of 120 minutes. After the end of this addition, 14.2 parts of a 20-percent aqueous ammonium persulfate solution were added thereto over a period of 20 minutes. For 100 minutes after the end of the second addition, the interior of the reactor was held at 95° C. to bring the polymerization to completion. Subsequently, the polymerization system was neutralized by addition of a 40-percent aqueous sodium hydroxide solution to produce an aqueous solution of a copolymer (1). The resultant polymer may be combined with tallowalkyliminobispropanol in solution wherein the tertiary amine is present at 0.5–6.0% by weight based on the polymer. The solutions should be stirred for 0.5 hours at ambient temperature, and the pH of final solution is expected to be around 4–4.5. It is expected that the resultant solutions may be stored at ambient conditions for 60 days without showing any phase separation.

The foregoing examples provided for illustrative purposes only and are not intended to limit the scope of the invention.

It is claimed:

1. An admixture system for modifying hydratable cementitious compositions, comprising:
   (A) a water reducer comprising a polycarboxylic acid or salt or derivative thereof; and
   (B) a tertiary amine defoamer having the structural formula $R^1NR^2R^3$ wherein
   $R^1$ is hydrophobic and represents a $C_8$–$C_{25}$ group comprising a linear or branched alkyl, alkene, alkyne, alcohol, ester or oxyalkylene group, the oxyalkylene group having the chemical structure $R^4$—$(AO)_n$— or $R^4$—$(OA)_n$— wherein $R^4$ represents hydrogen or a $C_1$ to $C_{25}$ alkyl group, A represents a $C_1$ to $C_6$ alkyl group and "n" is an integer of 1 to 4; and
   $R^2$ and $R^3$ each represent a $C_1$–$C_6$ group comprising a linear or branched alkyl, alkene, alkyne, alcohol, ester or oxyalkylene group, the oxyalkylene group having the chemical structure $R_4$—$(AO)_n$— or $R^4$—$(OA)_n$— wherein $R^4$ represents hydrogen or a $C_1$ to $C_{25}$ alkyl group, A represents a $C_1$ to $C_6$ alkyl group, and "n" is an integer of 1 to 4;
   wherein said average molecular weight of said tertiary amine defoamer is no less than 100, and
   wherein said average molecular weight of said tertiary amine defoamer is no greater than 1500.

2. The admixture system of claim 1, wherein said average molecular weight of said defoamer is no less than 200; and wherein said average molecular weight of said defoamer is no more than 750.

3. The admixture system of claim 1 wherein at least two of said groups represented by $R^1$, $R^2$, and $R^3$ have branched structures.

4. The admixture system of claim 1 wherein $R^1$ represents a linear alkyl or alkene group; and $R^2$ and $R^3$ represent linear or branched alkyl groups.

5. The admixture system of claim 1 wherein $R^1$ represents a linear alkyl or alkene group; and $R^2$ and $R^3$ represent linear or branched alcohol, ester, or polyoxyalkylene groups.

6. The admixture system of claim 1 wherein $R^1$ represents a branched alkyl or alkene group; and $R^2$ and $R^3$ represent linear or branched alkyl groups.

7. The admixture system of claim 1 wherein $R^1$ represents a branched alkyl or alkene group; and $R^2$ and $R^3$ represent linear or branched alcohol, ester, or polyoxyalkylene groups.

8. The admixture system of claim 1 wherein said polycarboxylic acid or salt or derivative thereof of component (A) and said tertiary amine defoamer of component (B) are present together in a ratio no less than 9:1 and in a ratio no more than 200:1.

9. The admixture system of claim 1 wherein said polycarboxylic acid or salt or derivative thereof of component (A) and said tertiary amine defoamer of component (B) are present together in a ratio no less than 11:1 and in a ratio no more than 100:1.

10. The admixture system of claim 1 wherein said polycarboxylic acid or salt or derivative thereof of component (A) and said tertiary amine defoamer of component (B) are present together in a ratio no less than 15:1 and in a ratio no more than 50:1.

11. The admixture system of claim 1 wherein said polycarboxylic acid or salt or derivative thereof is formed by reacting an acrylic polymer with ammonia or an alkoxylated amine.

12. The admixture system of claim 11 wherein said amine reactant used in forming said acrylic polymer is selected from ammonia or an alkyl-terminated alkoxy amine represented by the formula:

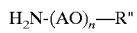

$$H_2N\text{-}(AO)_n\text{—}R''$$

in which AO represents a $C_2$–$C_{10}$ oxyalkylene group in which O represents an oxygen atom and A represents a $C_2$–$C_{10}$ alkylene group; and R" represents a $C_1$–$C_{10}$ alkyl group, and "n" is an integer selected from 1 to 200.

13. The admixture system of claim 12 wherein said acrylic polymer is a comb polymer comprising a carbon containing backbone to which is attached groups shown by the following structures (I) and (II), and, additionally and optionally, by structures (III) or (IV):

(I)

(II)

-continued

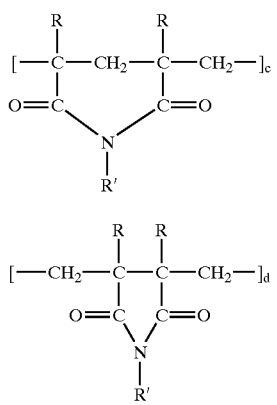

wherein each R independently represents a hydrogen atom or a methyl group (—CH$_3$) group; X represents hydrogen atom, a C$_1$–C$_{10}$ alkyl group, R' or an alkali or alkaline earth metal cation, an alkanolamine, or a mixture thereof; R' represents a hydrogen atom or a C$_2$–C$_{10}$ oxyalkylene group represented by (AO)$_n$R'' in which O represents an oxygen atom, A represents a C$_2$–C$_{10}$ alkylene group, R'' represents a C$_1$–C$_{10}$ alkyl and n represents an integer of from 1–200, or mixtures thereof; and a, b, c, and d are numerical values representing molar percentage of the polymer's structure such that a is a value of about 50–100; the sum of c plus d is 0 to a value of (100–a); and b is not more than (100–(a+c+d)).

14. The admixture system of claim 13 wherein said comb polymer comprises groups shown by structures (I), (II), (III), and (IV).

15. The admixture system of claim 13 wherein said water reducer is formed by polymerization of ethylenically-unsaturated carboxylic acids to form comb polymer backbone and by attaching to the backbone non-ionic pendant groups.

16. The admixture system of claim 1 wherein said water reducer further comprises ionically attached air-detraining functional side chains.

17. The admixture system of claim 1 further comprising a second amine defoamer having represented by the formula X$_2$N(BO)$_z$R, wherein X represents hydrogen, R represents hydrogen, a C$_1$–C$_{10}$ alkyl group, or BNH$_2$, B represents a C$_2$–C$_{10}$ alkylene group, and z represents an integer from 5 to 200.

18. The admixture system of claim 17 wherein said tertiary amine defoamer and said second amine defoamer are present in a ratio of 10:1 to 1:10.

19. The admixture system of claim 13 wherein said comb polymer comprises a copolymer of a polyoxyalkylene derivative and a maleic anhydride.

20. The admixture system of claim 13 wherein said water reducer comprises linear copolymers of N-vinylamides with addition products selected amines, amino acids, amino groups containing aromatic sulfonic acids, amino alcohols of maleic anhydride, and maleic esters of polyoxyalkyleneglycols or their monoethers, or a mixture thereof.

21. A hydratable cementitious composition comprising a hydratable cementitious binder and the admixture system of claim 1.

22. Method for modifying a hydratable cementitious composition, comprising introducing to a hydratable cementitious binder the admixture system of claim 1.

23. The admixture system of claim 1 wherein said tertiary amine defoamer comprises tallowalkyliminobispropanol, dodecyldimethylamine, octadecyldimethylamine, oleyldimethylamine, cocoalkyliminobispropanol, oleyliminobispropanol, tallowalkyldimethylamine, oleyldimethylamine, cocoalkyldimethylamine, soyaalkyldimethylamine, dicocoalkylmethylamine, tridodecylamine, or mixtures thereof.

24. The admixture system of claim 1 further comprising a primary amine.

* * * * *